(12) United States Patent
Baek et al.

(10) Patent No.: US 6,534,428 B2
(45) Date of Patent: Mar. 18, 2003

(54) TITANIUM DIBORIDE SINTERED BODY WITH SILICON NITRIDE AS A SINTERING AID

(75) Inventors: Yong Kee Baek, Taejon (KR); Hyoun-Ee Kim, Seoul (KR); June Ho Park, Seoul (KR); Eul Son Kang, Taejon (KR)

(73) Assignee: Agency For Defense Development, Daejon (KR)

( * ) Notice: Subject to any disclaimer, the term of this patent is extended or adjusted under 35 U.S.C. 154(b) by 0 days.

(21) Appl. No.: 10/143,083

(22) Filed: May 10, 2002

(65) Prior Publication Data

US 2002/0128143 A1 Sep. 12, 2002

Related U.S. Application Data

(62) Division of application No. 09/607,143, filed on Jun. 29, 2000, now Pat. No. 6,420,294.

(30) Foreign Application Priority Data

Jul. 3, 1999 (KR) .............................................. 99-26770

(51) Int. Cl.[7] .............................................. C04B 35/58
(52) U.S. Cl. ........................ 501/96.3; 501/92; 501/97.1; 501/97.4
(58) Field of Search ........................ 501/92, 96.3, 97.1, 501/97.4

(56) References Cited

U.S. PATENT DOCUMENTS

| 4,705,761 | A | * | 11/1987 | Kosugi | ........................ | 501/87 |
| 4,876,227 | A | * | 10/1989 | DeAngelis | ................. | 501/97.4 |
| 4,923,829 | A | * | 5/1990 | Yasutomi et al. | .......... | 501/95.2 |
| 5,439,856 | A | * | 8/1995 | Komatsu | ................... | 501/97.2 |

FOREIGN PATENT DOCUMENTS

| EP | 439419 | * | 7/1991 |
| JP | 1-172268 | * | 7/1989 |
| JP | 5-339061 | * | 12/1993 |
| JP | 7-309665 | * | 11/1995 |
| JP | 9-71470 | * | 3/1997 |

* cited by examiner

*Primary Examiner*—Karl Group
(74) *Attorney, Agent, or Firm*—Scully, Scott, Murphy & Presser

(57) ABSTRACT

The present invention relates to a titanium diboride sintered body and a method for manufacturing thereof wherein silicon nitride is added to a titanium diboride as a sintering aid. The sintered body according to the present invention has a fine structure and excellent physical characteristics such as a strength, hardness, etc. Therefore, the sintered body according to the present invention may be applicable to certain materials which requires high strength and hardness.

1 Claim, 6 Drawing Sheets

US 6,534,428 B2

TITANIUM DIBORIDE SINTERED BODY WITH SILICON NITRIDE AS A SINTERING AID

REFERENCE TO RELATED APPLICATION

This is a division of U.S. patent application, Ser. No. 09/607,143, filed Jun. 29, 2000, now U.S. Pat. No. 6,420,294.

BACKGROUND OF THE INVENTION

1. Field of the Invention

The present invention relates to a titanium diboride($TiB_2$) sintered body and a method for manufacture thereof, and in particular to a titanium diboride sintered body containing a silicon nitride as a sintering additive.

2. Description of the Background Art

Titanium diboride has a high melting point of ~3000° C., an excellent hardness of ~24 GPa and a high Young's modulus compared to other materials, and has a good abrasion resistance as well as an oxidation resistance at a high temperature. Therefore, titanium diboride is generally used as an armor material, a primary wall tile of a nuclear fusion furnace, a cutting tool, a wear-resistance material, etc. In addition, other structural ceramics have a low electrical conductivity, whereas titanium diboride has a high conductivity of $~10^{5 \Omega^{-1}} cm^{-1}$, so that titanium diboride has attracted much attention for the wide application. Further, since titanium diboride has an excellent corrosion resistance with respect to a metallic aluminum and $Na_3AlF_6$ which is a melting electrolytic solution in a hall-heroult cell used when refining aluminum, titanium diboride may be substituted with a metallic material for a cathode material. In addition, its excellent conductivity enables this material to be formed to complicated shapes by an electrical-discharge-machining, and consequently increasing the applicable range of this material.

Despite of the above-described characteristics of the titanium diboride, the development and application of the same are rather limited mainly because of difficulty in obtaining a fully dense body. Being a covalent material, the self-diffusion coefficient of the titanium diboride is extremely low, so that the mass transport for the densification is quite restricted. In addition, a thin oxygen-rich layer existing on the surface of the titanium diboride powder is known to be very detrimental to the densification. Therefore, pure titanium diboride has been densified at extremely high temperatures (~2000° C.) even with an applied pressure during the sintering. However, the high processing temperature are too expensive, and overgrowth of the particles during the process may deteriorate mechanical properties such as strength, etc.

Therefore, studies on the titanium diboride have focused on enhancing the sinterability. To improve the sinterability of the titanium diboride, transition metals such as Fe, Ni, and Co have been used as a sintering aid. The good wettability of these metals with the titanium diboride remarkably lowered the densification temperature. The addition of carbon was also found to be effective in improving the densification behavier of the titanium diboride by eliminating the oxide layer existing on the surfaces of the starting powder.

Another problem for wider application for the conventional titanium diboride is the relatively low strength and fracture toughness. Large grain size of the specimens, due to the high densification temperature or the oxide layer at the grain boundary, have very adverse effects on the mechanical properties. In addition, the formation of microcracks around the large grains during cooling because of thermal anisotropy of the titanium diboride further deteriorate the properties. Lots of attempts were made to improve the mechanical properties of the titanium diboride by adding a second phase as reinforcements. Non-oxides such as SiC, TiC, and $B_4C$ or oxides such as alumina($Al_2O_3$), zirconia($ZrO_2$) were used as reinforcing agents.

However, the addition of metals to titanium diboride deteriorates the unique properties of the ceramics. Despite significant improvement in the mechanical properties, the addition of large quantity of second phases tends to alter the properties.

SUMMARY OF THE INVENTION

Accordingly, it is an object of the present invention to provide a fully-dense and strong titanium diboride sintered body of enhanced sinterability by adding silicon nitride ($Si_3N_4$) as a sintering.aid and method for manufacturing thereof.

The titanium diboride is hot pressed at 1800° C. with the addition of silicon nitride as a sintering aid. The amount of silicon nitride has significant influence on the sinterability and the mechanical properties of the titanium diboride. When a small amount (2.5 wt %) of silicon nitride is added, the silicon nitride reacts with $TiO_2$ existing on the surface of titanium diboride powder to form TiN, BN, and amorphous $SiO_2$. The elimination of the $TiO_2$ suppresses the grain growth effectively, leading to the improvement in the densification of the titanium diboride. The formation of $SiO_2$ is also beneficial for the densification. The mechanical properties, especially the flexural strength, are enhanced remarkably through these improvements in the sinterability and the microstructure.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A illustrates a pure titanium diboride, and FIGS. 1B, 1C and 1D illustrate the titanium diborides with silicon nitride of 2.5 wt %, 5 wt %, and 10 wt %, respectively;

Figure 1A:
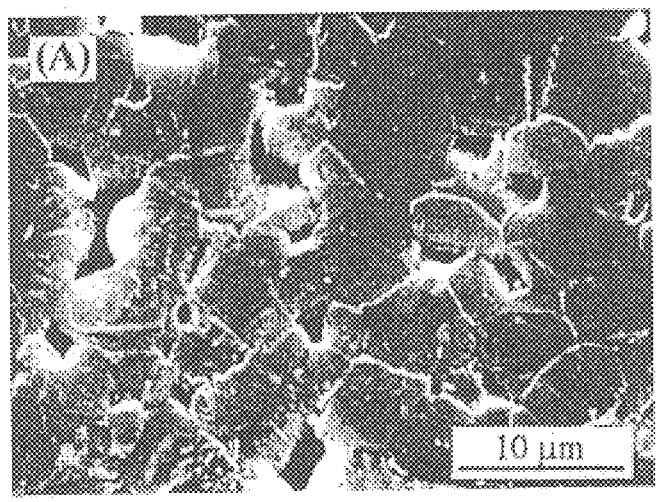
FIGS. 1A to 1D are SEM micrographs of the titanium diboride specimens hot-pressed at 1800 for 1 hour based on the amounts of silicon nitride added.
Figure 1B:
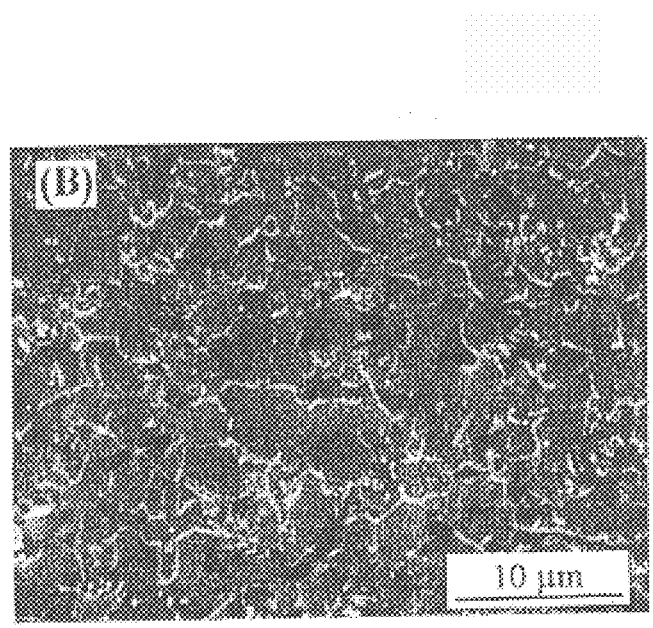
Figure 1C:
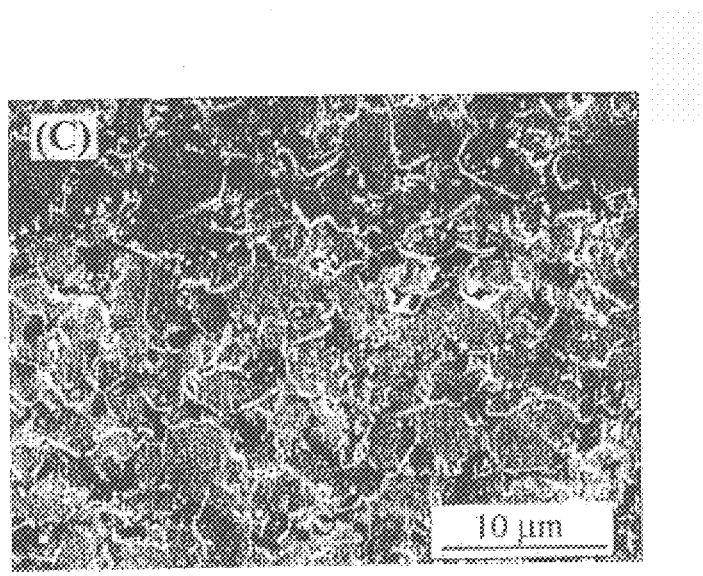
Figure 1D:
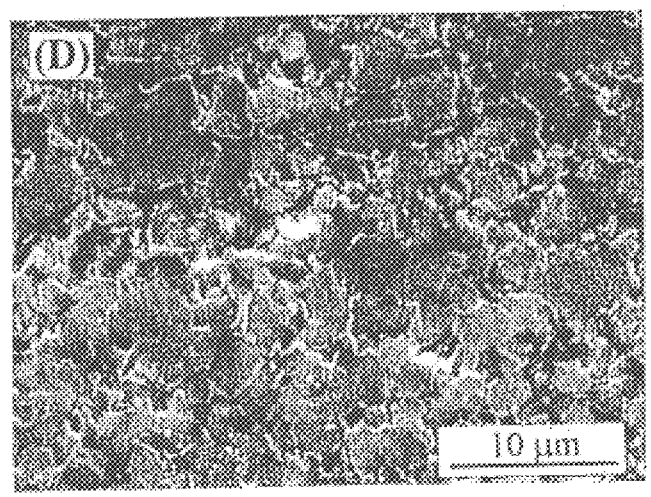

DETAILED DESCRIPTION OF THE PREFERRED EMBODIMENTS $TiO_2$ is an impurity on the surfaces of titanium diboride powders which has a bad effect on sintering of the titanium diboride. Adding silicon nitride as a sintering aid for reacting with the titanium oxide has an effect of removing the titanium oxide. In addition, silica ($SiO_2$) produced from the reaction enhances the sinterabilty of the titanium diboride.

The present invention provides a fully-dense and strong titanium diboride sintered body containing silicon nitride as a sintering aid. The amount of the silicon nitride is added preferablly in the range of 1~10 wt %.

A method for manufacturing a titanium diboride sintered body containing silicon nitride as a sintering aid is also provided, comprising the steps of adding silicon nitride to titanium diboride, mixing the titanium diboride and the silicon nitride by ball milling, and hot-pressing the titanium diboride containing the silicon nitride in a mold.

The hot-pressing is performed in a flowing Ar or $N_2$ atmosphere for 10 minutes through 4 hours. The temperature of the hot-pressing is in the range of 1500~2000° C., preferably 1600~1800° C., and the pressure applied is in the range of 10~45 MPa.

Instead of the hot-pressing method, another method can be provided, comprising molding the titanium diboride with the silicon nitride and sintering the titanium diboride containing the silicon nitride.

The sintering is performed for 30 minutes through 4 hours and at a temperature of 1700~2000° C. Hot isostatic pressing can be also performed after the sintering.

The construction and operation of a titanium diboride sintered body according to the present invention will be explained in detail. In the present invention, a certain amount of a silicon carbide (SiC) and silicon nitride may be added to the titanium diboride and then may be sintered under an ambient pressure or hot-press for thereby manufacturing a sintered body.

EXAMPLE

Commercially available $TiB_2$ powder (Grade F, H.C.Starck, Goslar, Germany) was used as a starting material. As a sintering aid, highly pure $\alpha$-$Si_3N_4$ powder (SN E-10, Ube Industries, Tokyo, Japan) was added up to 10 wt %. The powders were mixed by wet ball milling for 24 hours in a polyethylene bottle with $Si_3N_4$ balls and acetone as a media. After the mixing, the slurry was dried in a rotary evaporator and screened through a 60-mesh screen. The powder mixtures were hot pressed at 1800° C. for 1 hour, with an applied pressure of 30 MPa, in a flowing Ar atmosphere.

Specimens for mechanical tests were cut from the hot-pressed disks and machined into a bar shape with a dimension of 3 mm×4 mm×25 mm. All of the specimens were ground with a diamond wheel and polished with diamond paste down to 1 $\mu$m. Edges of all the specimens were chamfered to minimize the effect of stress concentration due to machining flaws. The strength was measured with a four-point bending configuration with a crosshead speed of 0.5 mm/min, and inner and outer spans of 10 and 20 mm, respectively. Vickers hardness was measured with a load of 0.98N for 15 seconds. At least five specimens were tested for each experimental condition.

The microstructures of the hot pressed specimens were observed with SEM after etching the polished surface with a dilute $HCl$-$HNO_3$ solution. The density and grain size of the specimens were determined by image analyses.

The addition of $Si_3N_4$ significantly changed the sinterability and the microstructure of the $TiB_2$ as shown in FIGS. 1. When pure $TiB_2$ was hot pressed at 1800° C. for 1 hour, the grain growth, rather than the densifications, occurred extensively as shown in FIG. 1A. When 2.5 wt % of $Si_3N_4$ was added to the $TiB_2$ powder and the mixture was processed under the same conditions, the density of the specimen was improved significantly and the grain size was reduced as shown in FIG. 1B. FIGS. 1C and 1D show the $TiB_2$ containing $Si_3N_4$ of 5 wt % and 10 wt %, respectively.

Figure 2:
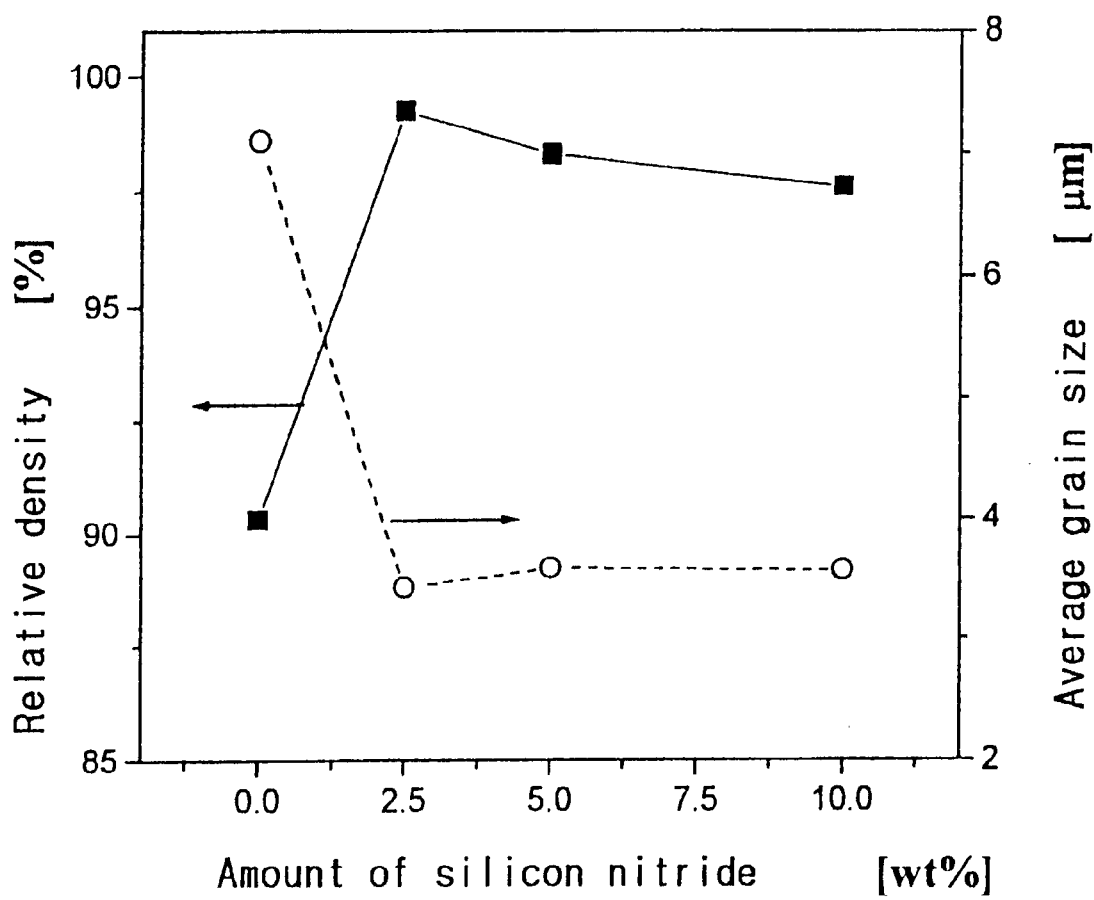
FIG. 2 is the relative density and the average grain size of the titanium diboride specimens depending on the amount of silicon nitride added.

From these micrographs, the relative density and the average grain size of the specimens were determined by the image analyses. The relative density of pure $TiB_2$ was only 90% of the theoretical value as shown in FIG. 2. With the addition of $Si_3N_4$; the density increased to higher than 99%. However, with further addition of $Si_3N_4$, the density decreased slightly. The average grain size was also strongly influenced by the $Si_3N_4$ addition. The average grain size of pure $TiB_2$ specimen was about 7 $\mu$m. The grain size was reduced to about 3 $\mu$m by the addition of 2.5 wt % $Si_3N_4$. With further addition of the $Si_3N_4$, the grain size remained about the same as shown in FIG. 2.

Figure 3:
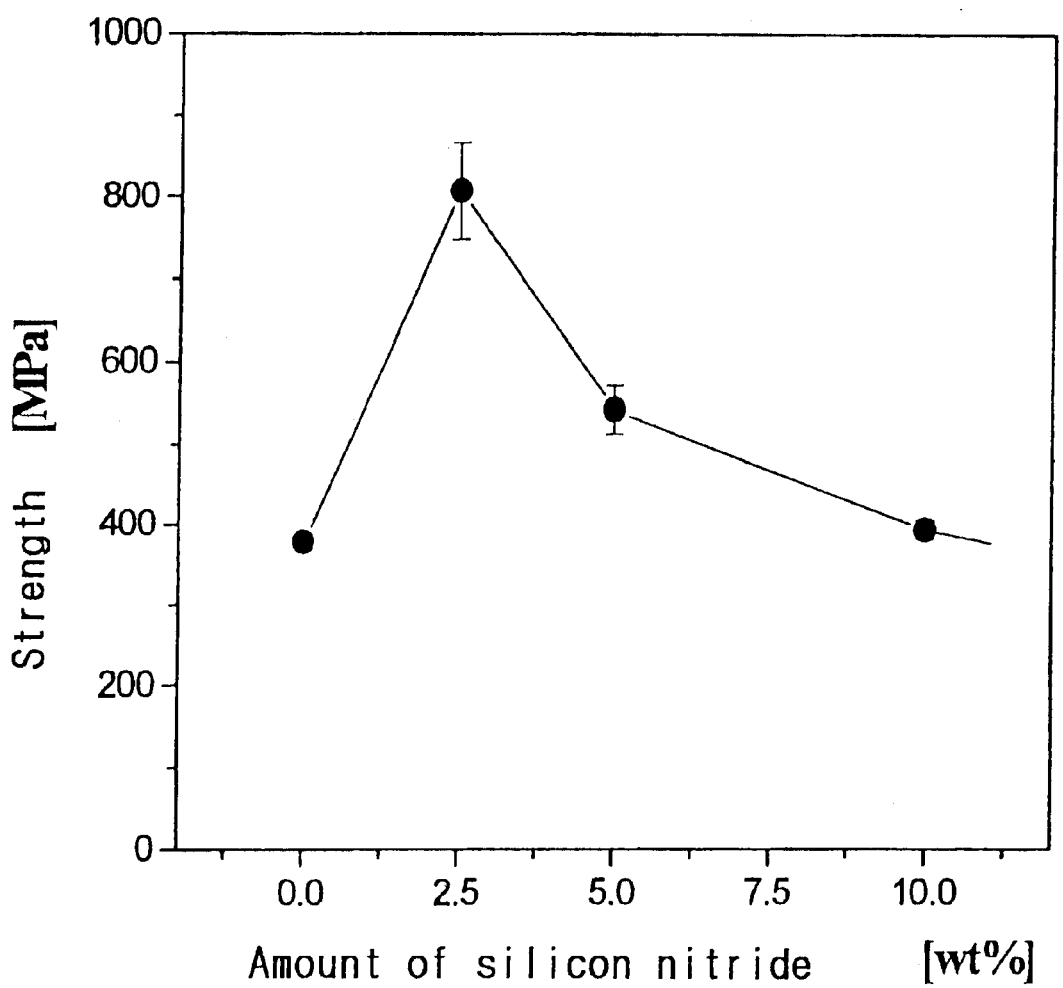
FIG. 3 is the flexural strength of the titanium diboride specimens depending on the amount of silicon nitride added.

The changes in the microstructure and the grain boundary phase influenced the mechanical properties of the $TiB_2$ significantly. The effect of the $Si_3N_4$ amount added on the flexural strength of $TiB_2$ is shown in FIG. 3. The 4-point bending strength of the $TiB_2$ hot pressed was about 400 Mpa. The strength was more than doubled by the addition of 2.5 wt % of $Si_3N_4$. The increase in strength was mainly attributable to the improvement in the density and to the reduction in the grain size.

Figure 4:
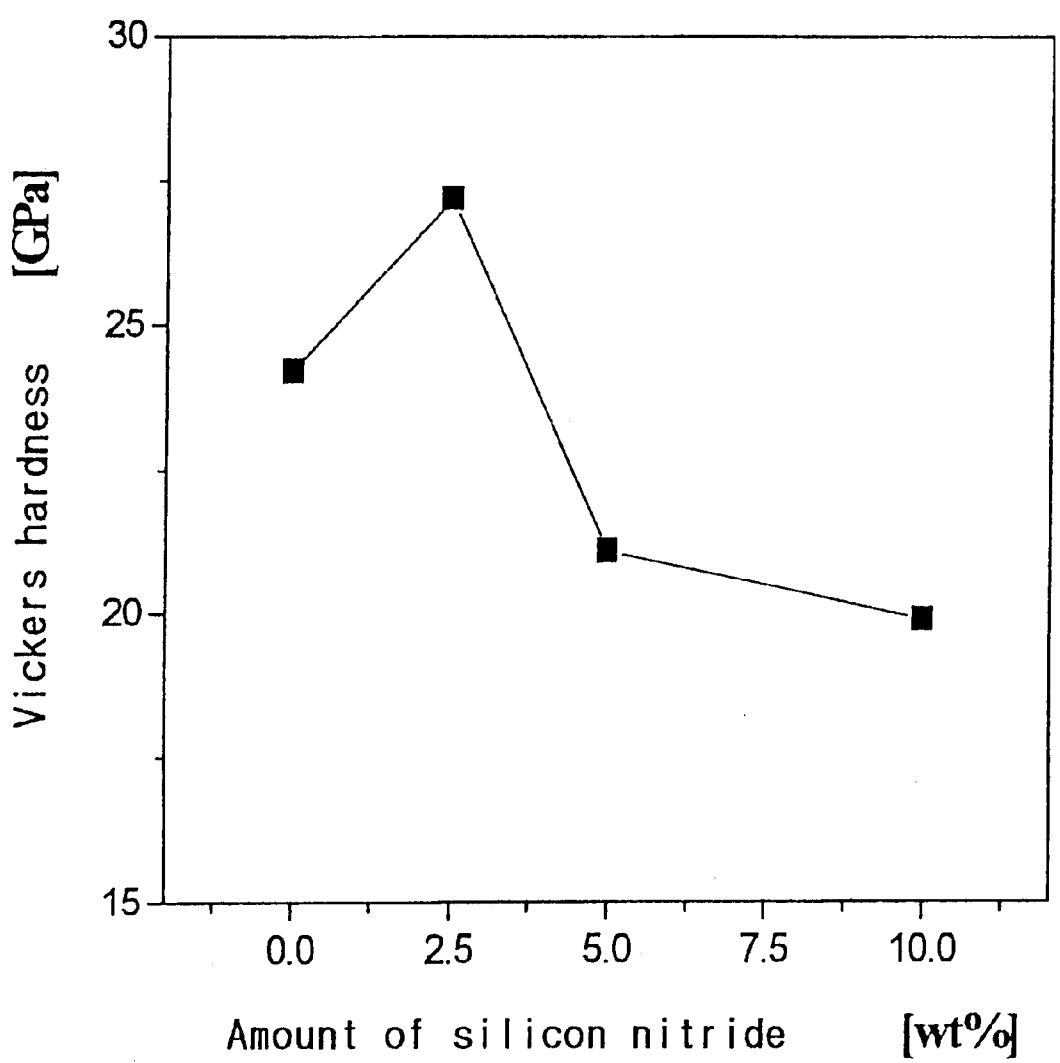
FIG. 4 is the Vickers hardness and fracture toughness of the titanium diboride specimens containing different amounts of silicon nitride.

The hardness of the specimen was also improved by the addition of 2.5 wt % of $Si_3N_4$ as shown in FIG. 4. The enhancement in the density by the addition of the $Si_3N_4$ was mainly attributable to this improvement.

Figure 5:
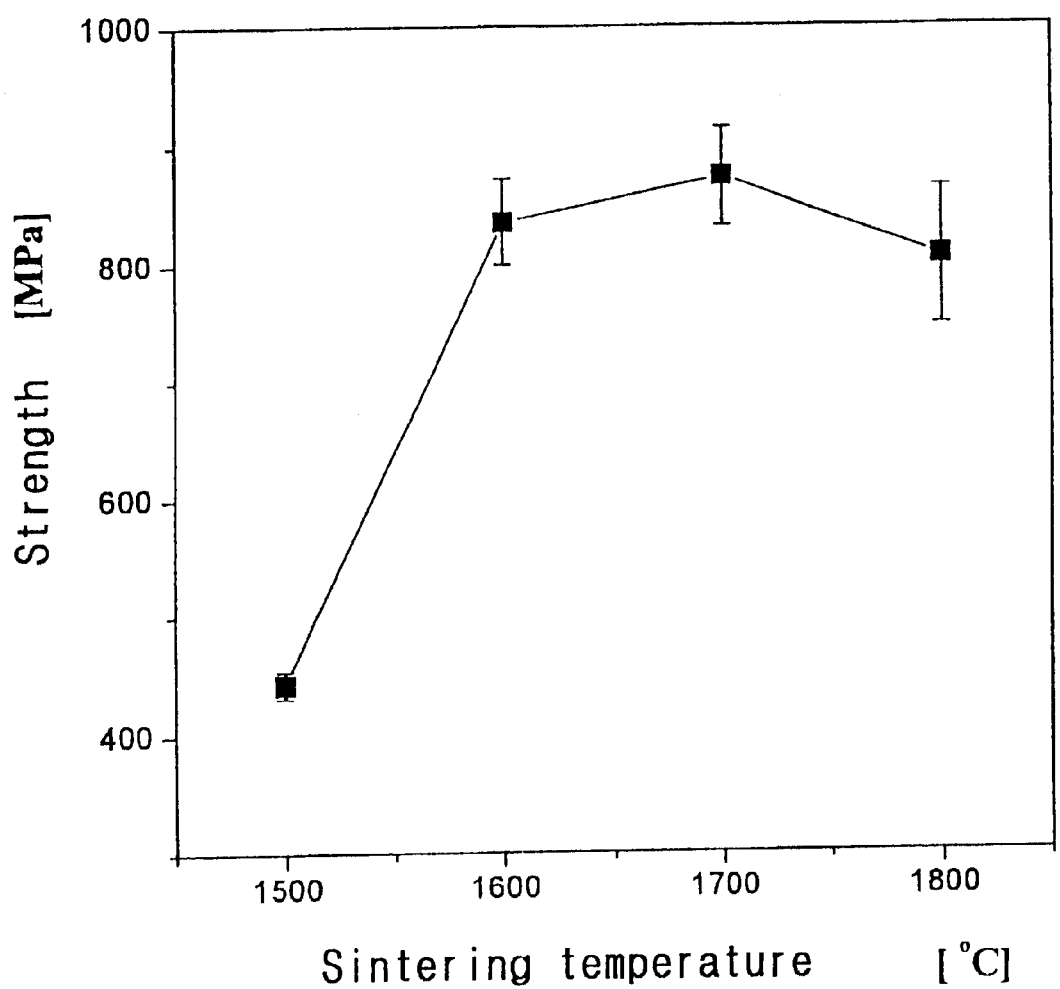
FIG. 5 is the flexural strength of titanium diboride with 2.5 wt % silicon nitride added depending on the sintering temperature.

The flexural strength of the specimen depending on increase of the sintering temperature are shown in FIG. 5. The strength increased with the sintering temperature up to 1700° C., however, decreased for 1800° C. This result indicates that the increase in strength is related to the sinterability and grain growth.

As described above, in the present invention, it is possible to manufacture a $TiB_2$ sintered body at a relatively low temperature by adding a certain amount of silicon nitride as a sintering aid. In addition, the sintered body has a fine structure and excellent physical properties such as a strength, hardness, etc. Therefore, the sintered body may be applicable to materials which require high strength and hardness.

Although the preferred example of the present invention have been disclosed for illustrative purposes, those skilled in the art will appreciate that various modifications, additions and substitutions are possible, without departing from the scope and spirit of the invention as recited in the accompanying claims.

What is claimed is:

1. A titanium diboride sintered body comprising titanium diboride, silicon nitride and silicon carbide, said silicon nitride and said silicon carbide being sintering aids, said silicon nitride being present in a range of 1 to 10 wt. %.

* * * * *